United States Patent [19]
Legueu

[11] 3,942,386
[45] Mar. 9, 1976

[54] GEAR BOX WITH INTEGRAL DIFFERENTIAL

[76] Inventor: Paul Etienne Rene Legueu, 85, Avenue du Mazy, Pornichet, France

[22] Filed: Dec. 11, 1974

[21] Appl. No.: 531,690

[30] Foreign Application Priority Data
Dec. 13, 1973 France .............................. 73.44486

[52] U.S. Cl. ................................................. 74/333
[51] Int. Cl.² .......................................... F16H 3/08
[58] Field of Search .............................. 74/333, 325

[56] References Cited
UNITED STATES PATENTS
3,727,479  4/1973  Wilson .................................. 74/333

*Primary Examiner*—Leonard H. Gerin
*Attorney, Agent, or Firm*—Weiser, Stapler & Spivak

[57] ABSTRACT

The gear box contains three parallel shafts, two of which are interconnected by a system of locking dogs. The third shaft is set in motion at selected different rates of rotation by either a direct drive gear or by a reduction gear. The direct drive gear and the reduction gear are formed of a single member constituted by a compact casting characterized in that it occupies a minimum of space.

9 Claims, 2 Drawing Figures

GEAR BOX WITH INTEGRAL DIFFERENTIAL

BACKGROUND OF THE INVENTION

This invention relates to a gear box with integral differential for use in automotive vehicles and more particularly is designed for use in compact vehicles of the air transportable type.

Gear boxes with integral differential are well known. They are normally constituted of a housing which encloses three spaced, parallel shafts referred to, respectively, as the reduction control shaft (lay shaft), the upper or driving shaft, and the differential shaft. The differential shaft is axially movable and its longitudinal displacement is effected by a gear shift lever having a fork engaged with an idler gear which provides a mechanical connection between the differential shaft and the driving shaft which is coupled to the vehicle transmission. The upper or driving shaft receives an idler gear which is axially movably splined upon said shaft and is capable of being selectively engaged either with the teeth of the ring gear which is a gear of the same modulus to provide direct drive (without reduction) or with the teeth of a second gear of smaller modulus called the reduction gear. The direct drive gear or the reduction gear energized by the idler thus imparts different speeds to the differential gear borne by the third or differential shaft. The differential gear provides, by the action of a differential gear system which consists of planetary and ring gears, the rotation of the differential shaft itself. The later consists of two parts which are susceptible of being coupled by a system of locking dogs under the control of a control handle. Each part of the differential shaft is connected to the forward and rear deck of the axles of the vehicle and are capable of rotating at the two different speeds.

This gear box, of known type and the integral differential, has the drawback of being massive and requires much space which makes it incompatible with the requirements imposed upon compact air transportable vehicles. This type of vehicle has rigorously limited dimensions to enable it to be loaded into a cargo plane. It must be designed and developed on the basis of mechanical components whose shape and size are specifically designed to conform to the mission of the vehicle.

SUMMARY OF THE INVENTION

Accordingly, it is an object of the invention to provide a gear box with integral differential in which the mechanical components have been individually designed so that their assembly occupies a reduced volume which does not detract from the compact design of the other components of the vehicle, such as the chassis, body, etc.

This and other objects which will appear are achieved by utilizing in the gear box a direct gear and a reducing gear to provide a connection between the drive shaft and the differential shaft in a single, unitary member. This unitary form of the two cast gears makes it possible, without reducing the strength, to reduce very appreciably the space occupied by the two gears, which heretofore were separate, and to correspondingly reduce the mass and weight of the gear box.

In addition and as a further feature, the differential gear, which in known embodiments was separate from the differential housing itself, has herein been made integral with the housing. As in the case of the rearrangement of the direct drive gear and the reduction gear, this makes it possible to reduce, through greater strength, the dimensions of the components in question, as well as the danger of breakage of the coupling elements and also the assembly time. Thus, needless assembly operations are eliminated and with it understandable errors which represent wasted time thereby unnecessarily increasing the cost of the machinery.

For further details, reference is made to the description which follows in the light of the accompanying drawings wherein:

DESCRIPTION OF THE PREFERRED EMBODIMENT OF THE INVENTION

Figure 1:
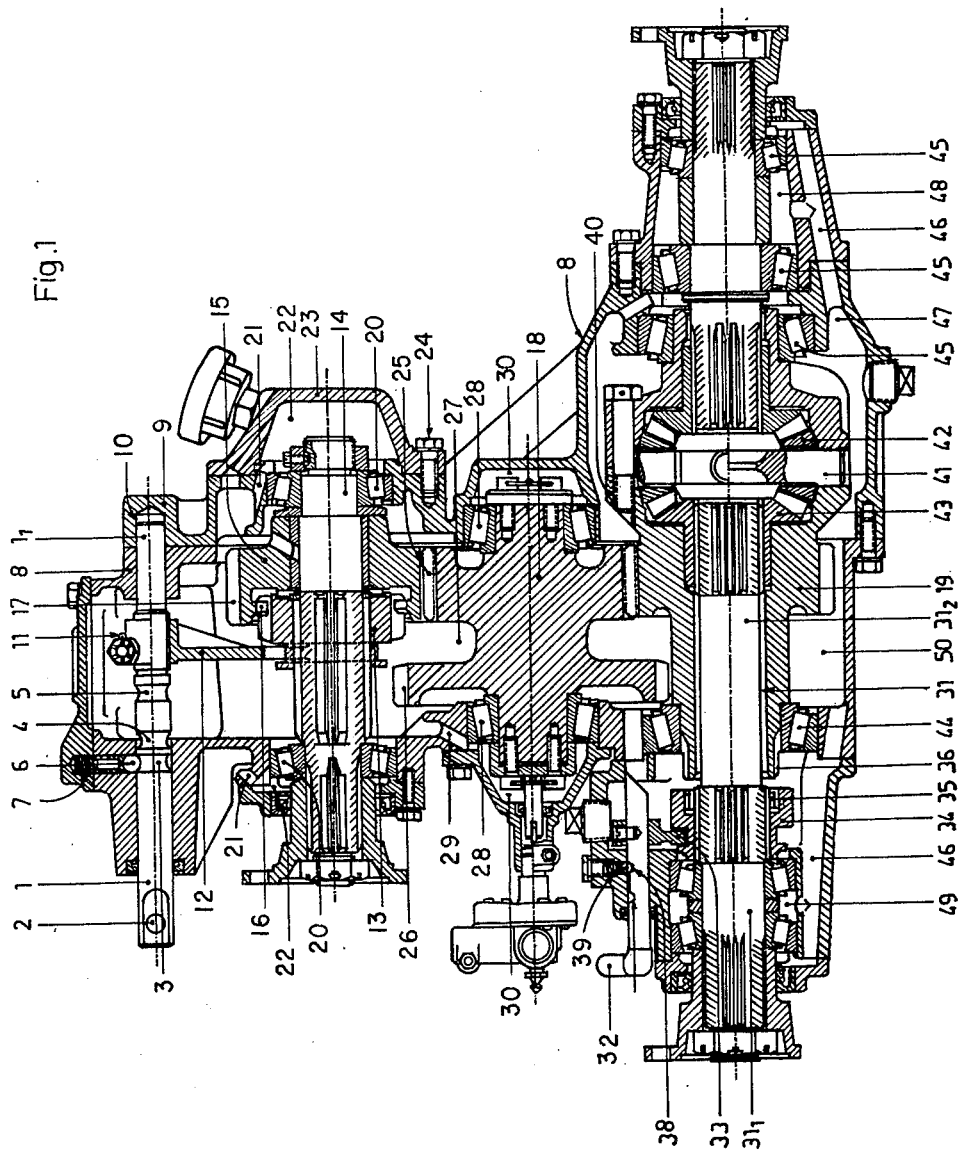
FIG. 1 is a side elevational cross sectional view of the gear box.

The gear box embodying the invention, as shown in cross section in FIG. 1, comprises three spaced apart, parallel shafts which are mechanically connected to each other. The first such shaft, namely the reduction control shaft 1 is axially moveable. Its longitudinal displacement is caused by a gear shift lever (not shown) attached to the extremity of the shaft 1 by a universal joint 2. The shaft 1 has three annular grooves 3, 4 and 5 respectively corresponding to the positioning of the shaft in direct drive, neutral or reduction drive. The shaft 1 is selectively latched in each of these three positions by a latching ball 6 by the bias of the helical spring 7. The diameter of this ball 6 corresponds to the concavity of the three grooves. The end $1_1$ of the shaft 1 opposite that connected to the gear shift lever, slides in the main housing 8 and cover 9 of the housing which is provided with a blind hole 10. By means of a cotter pin 11, a fork 12 is attached to the shaft 1 to activate an idler gear 13 which is axially slidable on a second shaft 14, which is splined. This shaft is called the upper or driving shaft. Shaft 14 supports a ring gear 15 having both internal teeth 16 and external teeth 17. The ring gear 15 meshes with another gear 18 of the same modulus and the gear 18 is in turn connected to the differential gear 19. The splined shaft 14 is supported at its lateral ends by conventional roller bearings which are liberally greased and lubricated through channels 21 opening into the lubricant storage chamber 22. The end of the shaft 14 at the power take off side is closed off by a lid or cover 23 which is attached by bolts 24. The cover 23 is removable and can therefore be taken off to permit direct attachment to this driving shaft of a power take off unit when the gear box is not in use. This unit, shown in FIG. 2, will hereinafter be more fully discussed.

The gear 18 which is interposed between the driving shaft 14 and the differential shaft 31 has the distinctive feature of being unitary or of one piece, formed by casting and of having two distinct sets of gear teeth 25 and 26 which are separated by an annular groove 27. Each of the two sets of teeth have a different modulus. The teeth 25 have the same modulus as the ring gear 15 which correspond to direct drive when the components are in the position shown in FIG. 11. On the other hand, the teeth 26 are in a ratio of one half to the idler gear 13, when the idler gear 13 meshes with the teeth 26, this corresponds to a gear reduction. The double tooth gear 18 which functions as both direct drive and reduction gear drive occupies a space which is smaller than that which would be required by two separate gears supported by a shaft. Thus this unitary, cast arrangement of two sets of gear teeth 25, 26 enables substantial reduction of the overall size of the gear box. Moreover, the increased strength of this component permits a reduction of its thickness and therefore also a lightening of the weight of the gear box. The gear 18 is supported at each end by a roller bearing 28 which is also freely lubricated by channels 29 opening into the lubricant storage chamber 30. The bearings supporting the gears 18 are therefore continuously lubricated to prevent premature wearing out.

The shaft 31 which is the differential shaft, is formed of two parts $31_1$ and $32_2$, susceptible of being coupled together by a locking dog system comprising a control handle 32 which is axially movable relative to the gear reduction shaft. This shaft carries a fork 33 engaging an idler gear 34 which latches the differential. This gear has teeth 35 capable of engaging the outer teeth 36 of differential gear 19. The control handle 32 has two indentations 37 and 38 corresponding to the two possible positions of the control handle 32, namely to the engaged and disengaged positions of the idler gear 34. In the form shown in FIG. 1 the latching ball 39 is in position in the recess 38 corresponding to the disengaged position of the gear 34. The other part $31_2$ of the differential shaft is splined and therefore fixed for rotation with the gear 19. The latter and this is also new, simultaneously constitutes the housing 40 of the differential. As previously indicated, the differential gear 19 and its enclosure were heretofore made of two pieces attached to a hollow shaft which considerably increased the weight and size of these mechanical components.

In accordance with the present invention, and with the object of reducing the weight and size of the gear box, the gear and housing of the differential are combined in a single unitary component of greater strength. This permits a reduction in the thickness of this component. This unitary gear 19 within the housing drives in conventional manner, the differential shaft 31 through the differential pinions 41, bevel pinions 42 and crown wheels 43. The differential assembly is enclosed in the main housing 8. The differential shaft 31 and its gear 19 are journalled in heavy duty roller bearings 44 and 45 which are lubricated and greased by a large channel 46 which communicates with the lubricant reservoirs 47, 48, 49 and 50.

This system operates as follows in the illustration of FIG. 1 wherein the gear changing control lever and the reduction control shaft 1 are in the direct drive position. This means that the idler gear 13 is positioned by its fork 12 with its outer teeth engaging the inner teeth 16 of the ring gear 15. Since the idler gear 13 is fixed for rotation on the splined driving shaft 14, this idler imparts rotation to the ring gear 15 which, being directly engaged with the gear 18 by meshing its external teeth 17 with the gear teeth 25 and having the same modulus, imparts rotation at the same speed to the gear 18. This rotation transmitted to the gear 18 is then further transmitted to the differential gear 19 which, through its housing imparts rotation to the differential pinions 41, the bevel gears 42 and the crown wheels 43 and, through them, to the differential shaft 31. In that position, only the portion $31_2$ of the differential shaft 31 connected to the drive shaft leading to the rear axle housing is caused to rotate, since the portion $31_1$ of the shaft is disconnected. This permits differences in speed between these two portions of the shaft. Coupling of the two portions $31_1$ and $31_2$ is obtained by displacing the control handle 32 toward the interior of the housing so that the latching ball 39 lodges in the recess 37. To reach that position the fork 33 which forms part of the handle 32 is displaced toward the right by a distance equal to that separating the two recesses 37 and 38 and this fork in turn displaces the idler gear 34 whose teeth 35 then slide onto mesh with the teeth 36 of the differential gear 19. The two portions $31_1$ and $31_2$ are then coupled and the gear box works in direct drive.

To place the gear box in neutral, all that needs to be done is to pull on the reducing control shaft 1 in such a way that its groove 4 becomes engaged by the latching ball 6. This displacement of the control shaft equally displaces toward the left thereby drawing the fork 12 and the idler 13 which is integral therewith. Thus, the gear teeth of the idler become disengaged from the interior gear teeth 16 of the ring gear 15 without however becoming engaged with the gear teeth 26 of the gear 18. The gear teeth of idler 13 therefore become positioned between the two sets of gear teeth 25 and 26.

To operate in gear reduction mode, the pull on the control shaft 1 is continued until the annular groove 5 registers with the latching ball 6. This longitudinal displacement of the shaft 1 has the effect of displacing further to the left the fork 12 and its idler 13 so that its teeth become engaged with the teeth 26 of the gear 18. Since that gear 18 has a modulus twice that of the idler, the relationship which results is approximately one-half. Driving of the gear 18 again produces driving of the differential shaft 31 by its differential gearing system.

Figure 2:
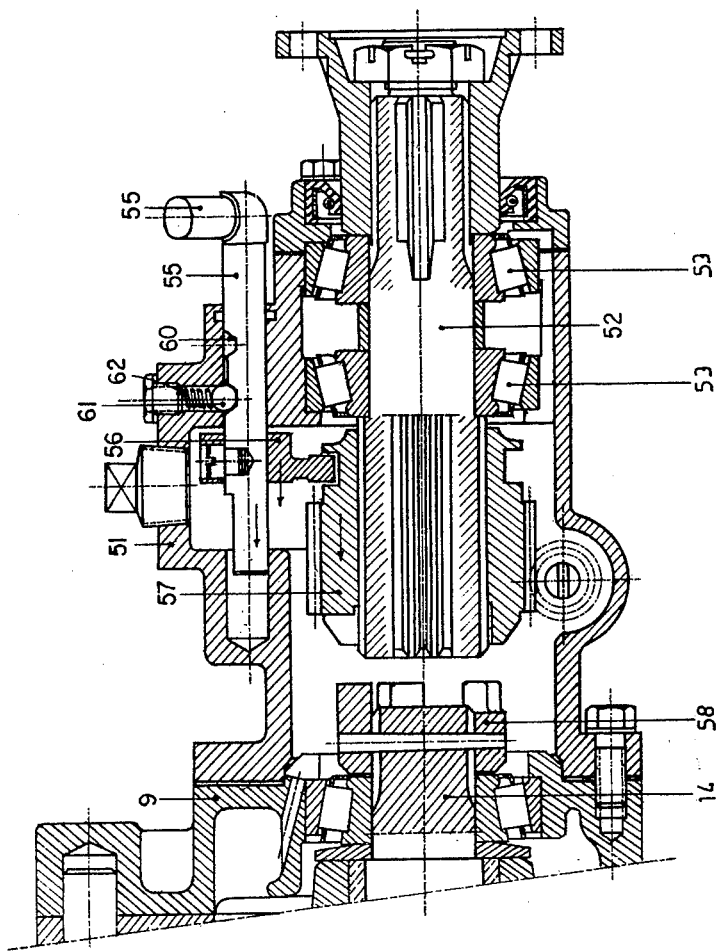
FIG. 2 is a side elevational cross sectional view of a complimentary power take off suitable for coupling to the gear box of FIG. 1.

When the gear box is in neutral, i.e. when the driving shaft 14 is set into rotation and does not transmit its movement to the differential shaft 31, it is possible to couple to this driving shaft 14 a power take-off system such as illustrated in FIG. 2, to which reference may now be made. To that end, as previously indicated, it suffices to remove the cap 23 and to mount on the housing 9 the system in question which is constituted primarily of the housing 51, a power take-off shaft 52 supported by bearings 53, and a locking system comprising, again, a shaft 54 which is connected to a control lever 55. The lever 55 and integral shaft 54 has mounted thereon a fork 56 to provide longitudinal displacement of a follower 57 which is capable of being connected to the fixed coupling 58 of the upper or driving shaft 14. In FIG. 2, the system is shown in decoupled position. To obtain coupling, it suffices to displace the shaft 54 in the direction of the arrow to a position wherein the recess 60 is lined up with the latching ball 61 which is biased by the spring 62. Displacement of this shaft 54 corresponds to displacement toward the left of the fork 56 and its follower 57. This movement of shaft 54 and its follower corresponds to engagement of the teeth of the mobile interlock of the follower 57 and fixed interlock 58. The follower 57 being fixed for rotation by the shaft 52 imparts rotation to it when it is coupled to the fixed interlock 58. Thus the shaft 52 may receive for example the attachment of excavating equipment or other tools requiring motive force. The follower 57 alternatively engages a tangential gear driving an oil pump which circulates oil within the gear box when the latter is in neutral.

This gear box with integral differential has the advantage of being about thirty per cent lower in weight and size then equivalent gear box whose nominal input couple is 30 mkgs and whose maximum imput couple is 210 mkgs. Thus, a gear box capable of this performance weighs only 109 kgs. It is also noted that gear box embodying the invention is such that the gears have progressive arrangement from the reduction control lever to the differential shaft. All the thicknesses and mechanical components are reduced which requires the use of a special malleable alloy (alloy GS) and continuous lubrication. Accordingly the arrangement of the lubricating channels provided in the housing makes this possible and prevents premature failure of the components during usage.

Because of its execution with comparatively small size and low weight, this gear box is particularly suitable for compact or low profile vehicles of the type called air transportable.

It will be understood that the example given above does not limit the invention and that other variants will occur to those skilled in the art without departing from the inventive concept.

I claim:
1. A gear box with integral differential comprising:
   a unitary gear having a first set of gear teeth of predetermined pitch and pitch diameter, and a second set of teeth axially spaced from the first set by an annular groove and of substantially different pitch and/or pitch diameter;
   a ring gear whose outer teeth permanently engage said first set of gear teeth;
   a differential drive gear whose teeth also permanently engage said first set of gear teeth; and
   a gear reciprocable between three axially spaced positions, engaging the inner teeth of said ring gear in one said position, engaging said second set of teeth in said unitary gear in another of said position, and being aligned with said groove in said unitary gear in the third of said positions.

2. The apparatus of claim 1, wherein said gears are of increasing volume going from the ring gear toward the differential drive gear.

3. The apparatus of claim 1, wherein said unitary gear is a one-piece casting, thereby obtaining high mechanical strength.

4. The apparatus of claim 1, wherein said differential drive gear is one piece with the differential casing 5. The apparatus of claim 1, wherein said reciprocable gear is slidably engaged on the main drive shaft of the gear box, and the trailing end of said shaft has a cover which is removable to permit attachment of a power take-off mechanism to said shaft.

6. The apparatus of claim 5, wherein said power take-off mechanism comprises an axially reciprocable gear sliding on a shaft between two spaced positions, in one of which it engages said main drive shaft while in the other it does not.

7. The apparatus of claim 6, wherein said axially reciprocable gear has external teeth engaging a tangentially disposed pinion driving an oil pump for recirculating the oil in said gear box.

8. The apparatus of claim 1, wherein lubricating ports and reservoirs are provided at the bearing of the moving parts of the apparatus.

9. The apparatus of claim 1, wherein said differential has two power output shafts, one permanently connected to an output gear of the differential, and the second disconnectable from the other output gear of the differential.

* * * * *